Patented Nov. 11, 1924.

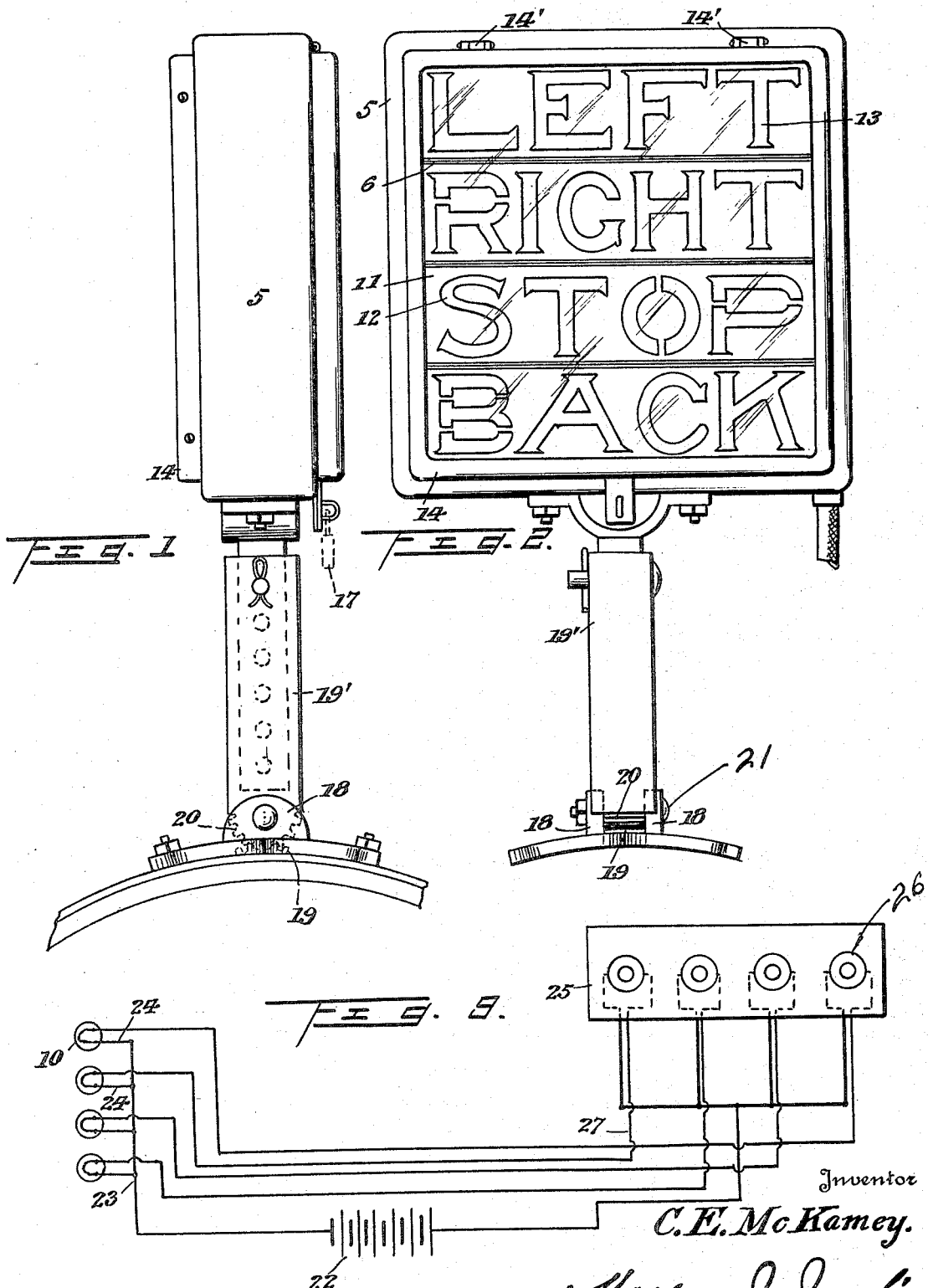

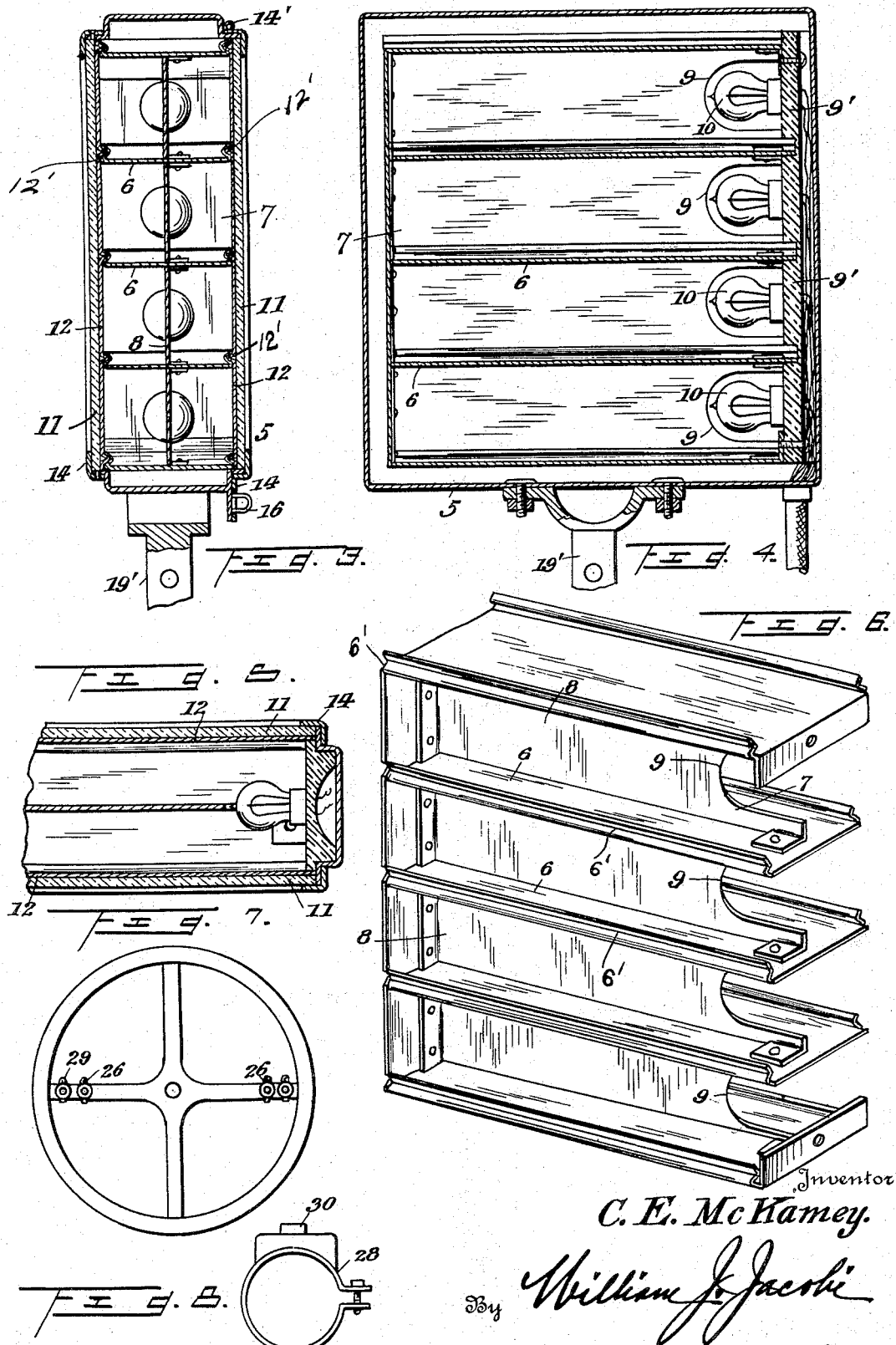

1,514,711

UNITED STATES PATENT OFFICE.

CLIFTON E. McKAMEY, OF DAVENPORT, IOWA.

AUTOMOBILE DIRECTION INDICATOR.

Application filed October 16, 1922. Serial No. 594,879.

*To all whom it may concern:*

Be it known that CLIFTON E. McKAMEY, a citizen of the United States of America, residing at Davenport, in the county of Scott and State of Iowa, has invented certain new and useful Improvements in Automobile Direction Indicators, of which the following is a specification.

My invention relates to automobile direction indicators and its principal object is to provide a device of this character which will warn traffic both in the rear and forward of the automobile of the movement the automobile is about to make.

A further object of the invention is to provide an indicator or signal of this character employing a casing having various visible signals to indicate the various movements of the automobile which may be seen by both forward and trailing traffic.

Another object of the invention is to provide a new and improved racket for mounting the device at any point on the automobile found convenient and is adjustable so that the casing will be held in a perpendicular position at all times regardless of the inclination of the base or the support upon which it is mounted.

Another object of the invention is to provide a signal or indicator of this type employing a plurality of illuminated signs, which are electrically operated and controlable from the steering wheel of the automobile.

With the preceding and other objects and advantages in mind the invention consists in the novel combination of elements, construction, and arrangement of parts and operations to be hereinafter specifically referred to, claimed and illustrated in the accompanying drawing, wherein—

Figure 1 is a side elevation of the device mounted upon an automobile fender;

Figure 2 is a rear elevation of the signal with the lamp base partly removed;

Figure 3 is a vertical sectional view of the same;

Figure 4 is a transverse sectional view of my invention;

Figure 5 is an enlarged sectional detail view showing the signs mounted in the casing;

Figure 6 is a perspective of the lamp casing having the sign and lamp face removed;

Figure 7 is a view showing push buttons on the steering wheel;

Figure 8 is a detail view of the bracket embodied in the invention; and

Figure 9 is a diagrammatical view of the signal and electrical wiring.

Referring in detail to the drawings wherein corresponding characters of reference denote corresponding parts thruout the several views the numeral 5 denotes a rectangular casing open at its opposite ends. This casing 5 is provided with a plurality of horizontally arranged partitions 6 to divide the casing in a plurality of compartments 7. A vertically arranged wall 8 is disposed centrally of the casing and formed in one of its vertical edges with a plurality of spaced notches or openings 9, one for each compartment 7. A non-conducting lamp base, of rectangular configuration is designated at 9' and carried at one of the vertical sides of the casing and carries a plurality of illuminating bulbs 10 each of which being received in one of the notches or recesses 7. It will be thus seen that the light rays from the bulb 10 will be projected upon opposite sides of the wall 8. Disposed against each of the open ends of the casing 5 is a translucent panel or glass 11 and super-posed on the panels or glass 11 are panels 12 having cut-out signs 13 which indicate "left" "right" "stop" "back" respectively, each of these signs registering with one of the compartments 7. Frames 14 embrace the edges of these panels 12 and are connected with the casing 5 to hold the sign and translucent glasses into position. As shown in Figure #3 one of the rims 14 is hinged as at 14' to the casing 5 and engaged with a staple 16, the latter receiving a lock 17. The side edges of the horizontal partitions 6 are provided with upstanding flanges which extend inwardly and thence outwardly to provide channels or grooves 6', as clearly shown in Fig. 6 of the drawings. The panels 12 are provided at regular intervals with horizontal beads 12' adapted to be received in said grooves 6', as clearly shown in Fig. 3 of the drawings. Thus when the panels are positioned on the casing, the parts will interfit snugly.

In order to mount the casing 5 on one of the mud guards or other part of the automobile there is provided a cruciform base which is bolted or otherwise secured to the fender by bolts. A pair of upstanding ears 18 is formed on the base and formed on this base between the ears is a plurality of teeth 19. Attached to the under face of the casing 5 is a part 19' formed with a toothed segment 20 at its lower end which is pivotally connected between the ears 18 by a pivot bolt 21 and the teeth 19 engage with the tooth segment 20. By the provision of the toothed segment 20 and the teeth 19 on the base it will be seen that the casing may be supported on any irregular base.

In the diagrammatical view a generator or other source of electrical energy is designated at 22 and leading therefrom is a conductor 23 connected in parallel with the illuminating bulbs 10 by wires 24. The other panel of the source of electrical energy connects with a circuit closer 25 having a plurality of push buttons 26 each of the latter being connected by a conductor 27 each of which leads to one of the lamp bulbs 10. From the disclosure it follows that upon operation of any one of the buttons 26 the corresponding lamp bulb 10 will be illuminated, to render the corresponding signal visible.

In connection with the push buttons or circuit closer a modification is illustrated. This modification comprises clamping rings 28 clamped to the post of the steering wheel designated at 29 and carried by each of the clamping rings is a push button 30.

From the foregoing it will be seen that I have provided a simple, inexpensive and efficient means for carrying out the objects of the invention, and while I have particularly described the means best adapted to perform the functions set forth, various changes in form, proportion and in the minor details of construction may be resorted to without departing from the spirit or sacrificing any of the principles of the invention.

What I claim as new and desire to protect by Letters Patent is:

1. A device of the class described comprising a casing having open ends, a plurality of horizontally arranged partitions supported in the casing, the side edges of said partitions being provided with longitudinal grooves, panels overlying the open ends of said casing and provided with spaced horizontal beads adapted to be received in the grooves of said partitions, said panels having indicia thereon, translucent panes overlying said panels and illuminating means within said casing.

2. A device of the class described comprising a casing having open ends, a frame supported therein comprising vertical and horizontal partitions, the horizontal partitions having their side edges provided with upstanding flanges bent inwardly and thence outwardly to form V-shaped channels, panels disposed over the open ends of said casing and provided at regular intervals with horizontal inwardly projecting beads adapted to be received in the V-shaped channels of said partitions, said panels having indicia thereon, translucent panes overlying said panels and illuminating means within said casing.

In testimony whereof I affix my signature.

CLIFTON E. McKAMEY.